US007609879B2

United States Patent
Yokochi

(10) Patent No.: US 7,609,879 B2
(45) Date of Patent: Oct. 27, 2009

(54) IMAGE PROCESSING DEVICE

(75) Inventor: Atsushi Yokochi, Chiryu (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 712 days.

(21) Appl. No.: 10/937,350

(22) Filed: Sep. 10, 2004

(65) Prior Publication Data
US 2005/0058364 A1 Mar. 17, 2005

(30) Foreign Application Priority Data
Sep. 11, 2003 (JP) .............................. 2003-320168

(51) Int. Cl.
G06K 9/00 (2006.01)
(52) U.S. Cl. ........................ 382/162; 358/515; 358/518; 358/534
(58) Field of Classification Search ................ 382/3.06, 382/176, 162
See application file for complete search history.

(56) References Cited

U.S. PATENT DOCUMENTS

| 4,953,013 | A | * | 8/1990 | Tsuji et al. .................. 358/530 |
| 5,072,291 | A | * | 12/1991 | Sekizawa .................... 358/535 |
| 5,291,309 | A | * | 3/1994 | Semasa ...................... 358/3.24 |
| 5,341,226 | A | * | 8/1994 | Shiau ......................... 358/518 |
| 5,410,619 | A | * | 4/1995 | Fujisawa et al. ............ 382/254 |
| 5,696,842 | A |   | 12/1997 | Shirasawa et al. |
| 5,740,334 | A | * | 4/1998 | Lin et al. ..................... 358/1.9 |
| 5,825,937 | A | * | 10/1998 | Ohuchi et al. ............... 382/261 |
| 5,991,512 | A | * | 11/1999 | Shaked et al. ................ 358/1.9 |
| 5,991,513 | A | * | 11/1999 | Levien ....................... 358/3.26 |
| 6,026,216 | A | * | 2/2000 | Ohtsuka et al. .............. 358/1.9 |
| 6,075,614 | A | * | 6/2000 | Ohtsuka et al. .............. 358/1.1 |
| 6,088,489 | A | * | 7/2000 | Miyake ....................... 382/299 |
| 6,128,408 | A | * | 10/2000 | Clark .......................... 382/173 |
| 6,172,770 | B1 | * | 1/2001 | Inoue ......................... 358/3.06 |
| 6,181,829 | B1 | * | 1/2001 | Clark et al. ................. 382/273 |
| 6,185,328 | B1 | * | 2/2001 | Shiau ......................... 382/173 |
| 6,185,336 | B1 | * | 2/2001 | Clark et al. ................. 382/224 |
| 6,229,923 | B1 | * | 5/2001 | Williams et al. ............ 382/224 |
| 6,347,153 | B1 | * | 2/2002 | Triplett et al. ............... 382/224 |
| 6,390,583 | B1 |   | 5/2002 | Kato et al. |
| 6,449,060 | B1 | * | 9/2002 | Kawai et al. ................ 358/1.9 |
| 6,515,768 | B1 | * | 2/2003 | Deschuytere et al. ....... 358/3.06 |
| 6,947,178 | B2 | * | 9/2005 | Kuo et al. ................... 358/3.08 |
| 7,262,879 | B2 | * | 8/2007 | Chang ........................ 358/1.9 |
| 2002/0070948 | A1 | * | 6/2002 | Murai et al. ................ 345/589 |
| 2002/0154339 | A1 | * | 10/2002 | Kuo et al. ................... 358/3.08 |
| 2003/0133607 | A1 | * | 7/2003 | Goto et al. .................. 382/162 |
| 2004/0233463 | A1 | * | 11/2004 | Hersch et al. ............... 358/1.9 |

(Continued)

FOREIGN PATENT DOCUMENTS

JP A 62-226770 10/1987

(Continued)

Primary Examiner—Sath V Perungavoor
(74) Attorney, Agent, or Firm—Oliff & Berridge, PLC

(57) ABSTRACT

An image-processing device includes a determining unit that determines a likelihood degree of an input image being a halftone image and a plurality of spatial filters having different characteristics The spatial filters produce a plurality of component-image data sets from the input image data. A selecting unit selects one of the spatial filters based on the determined likelihood degree and then outputs component-image data produced by the selected spatial filter.

13 Claims, 10 Drawing Sheets

U.S. PATENT DOCUMENTS

2005/0058364 A1 * 3/2005 Yokochi .................... 382/261

FOREIGN PATENT DOCUMENTS

| JP | B2 3193086 | 6/1993 |
| JP | A 7-111602 | 4/1995 |
| JP | A 8-181864 | 7/1996 |
| JP | A 8-237475 | 9/1996 |
| JP | B2 2647456 | 5/1997 |
| JP | A 9-247481 | 9/1997 |
| JP | A 2000-307865 | 11/2000 |

* cited by examiner

FIG. 4(a)

| LIKELIHOOD DEGREES PR, PG, PB | SPATIAL FILTER |
|---|---|
| n | $n^{th}$ FILTER (SMOOTHNESS n) |
| n−1 | $n-1^{th}$ FILTER (SMOOTHNESS n−1) |
| ⋮ | |
| 2 | 2nd FILTER (SMOOTHNESS 2) |
| 1 | 1st FILTER (SMOOTHNESS 1) |
| 0 | SMOOTHNESS/ENHANCING FILTER (SMOOTHNESS 0) |

| LIKELIHOOD DEGREE P | SPATIAL FILTER |
|---|---|
| n | $m^{th}$ FILTER (SMOOTHNESS n) |
| n−1 | $m-1^{th}$ FILTER (SMOOTHNESS n−1) |
| ⋮ | ⋮ |
| 2 | 3rd FILTER (SMOOTHNESS 2) |
| 1 | 2nd FILTER (SMOOTHNESS 1) |
| 0 | 1st FILTER (SMOOTHNESS 0) |

| LIKELIHOOD DEGREES PR, PG, PB | SPATIAL FILTER |
|---|---|
| n | $n^{th}$ FILTER (SMOOTHNESS n) |
| n−1 | $n-1^{th}$ FILTER (SMOOTHNESS n−1) |
| ⋮ | ⋮ |
| 2 | 2nd FILTER (SMOOTHNESS 2) |
| 1 | SMOOTHNESS/ENHANCING FILTER, 1st FILTER (SMOOTHNESS 0.5) |
| 0 | SMOOTHNESS/ENHANCING FILTER (SMOOTHNESS 0) |

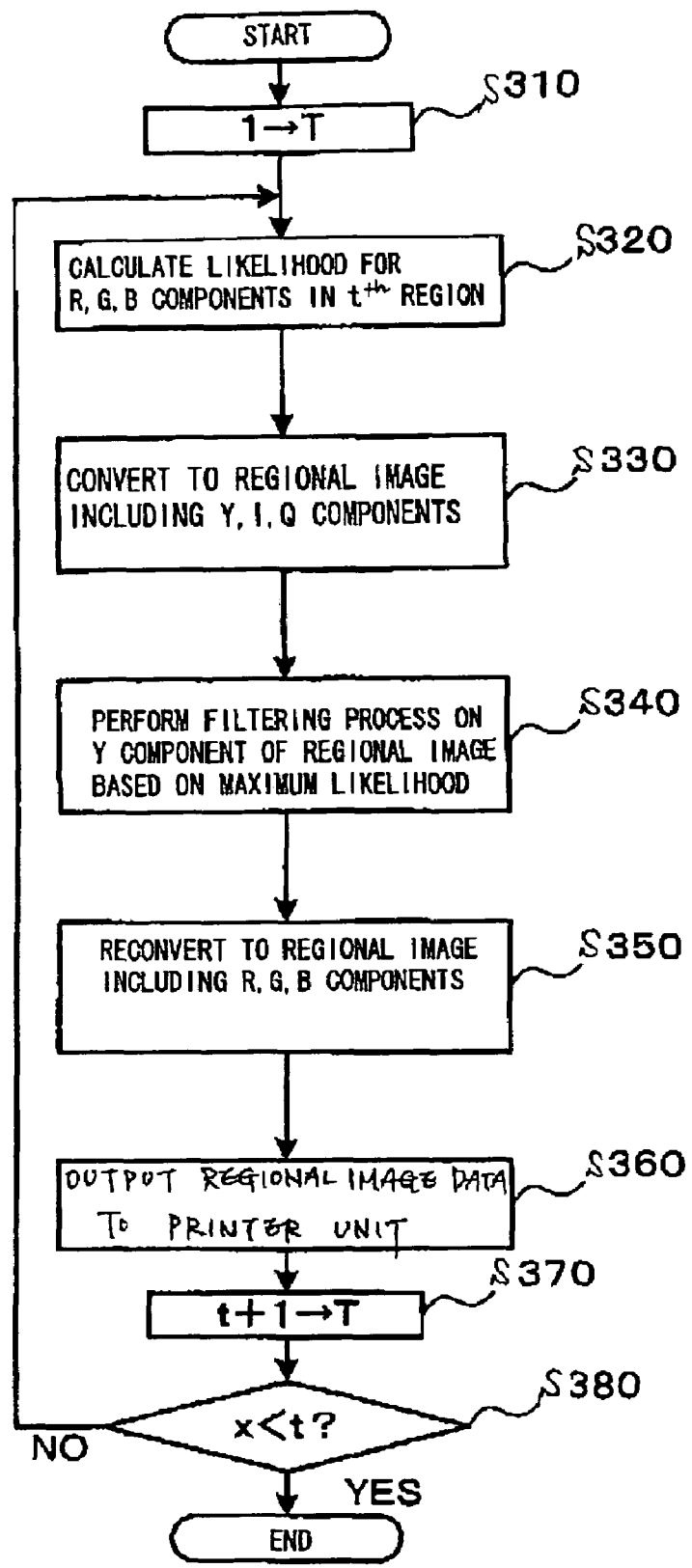

IMAGE PROCESSING DEVICE

BACKGROUND OF THE INVENTION

1. Field of the Invention

The present invention relates to an image-processing device for processing image data, and an image-processing method and image-processing program that can be used by the image-processing device.

2. Related Art

When printing an image based on image data read by a scanner or acquired through other means, image processing has conventionally been performed using spatial filters to remove noise components from the image.

For example, halftone images read by a scanner often include a noise component that can lead to moiré or the like. Therefore, scanned image data is commonly passed through a spatial filter capable of removing (or at least reducing) the noise component prior to printing.

Japanese unexamined patent application publication No. HEI-7-111602 proposes an image-forming device configured to determine whether or not an image represented by acquired image data is a halftone image (setting the output of a halftone-dot separating unit to "H" or "L") and switch the characteristics of a spatial filter to be used on the image data targeted for output according to the results of the determination. Hence, the image-forming device can remove noise components in accordance with the acquired image.

SUMMARY OF THE INVENTION

Halftone images are configured of collections of dots, representing light and dark colors by varying sizes of the dots. Therefore, if the resolution of the scanner is not sufficiently higher than the resolution of the dots, then the dots configuring the halftone image may not be accurately scanned, leading to the aforementioned noise component, and also the image data read in this process will represent an image that does not reproduce the original image. Therefore, errors due to the noise component may influence the determination of whether the image is a halftone image or not.

Forcing a choice between two alternatives as in the above determination, in which the image is determined to be either a halftone image or not a halftone image, reduces the precision of the determination, resulting in incorrect determinations. When an incorrect determination is made, for example, a spatial filter (smoothing filter) may not be used even though a noise component is present in the data. Hence, the noise component will not be removed from the image. Similarly, a spatial filter may be mistakenly used when a noise component is not present, leading to a loss of sharpness in the resulting image. Mistakes in determinations as to whether an image is a halftone image or not can produce an unpleasant appearance in the image, particularly in areas where halftone images border non-halftone images. While it is possible to reduce this unpleasant appearance by setting the characteristics of the spatial filter to a low smoothness, this is undesirable because the noise component cannot be sufficiently removed.

Hence, when performing a determination between two choices, such as whether the image is a halftone image or not a halftone image, the image ultimately obtained sometimes includes a noise component that results in an unpleasant appearance.

In the view of foregoing, it is an object of the present invention to overcome the above problems, and also to provide a technology that reduces the likelihood of obtaining an unpleasant appearing image including a noise component when processing an image with spatial filters.

In order to attain the above and other objects, according to one aspect of the present invention, there is provided an image-processing device including a likelihood determining unit, a filter unit, and an output unit. The likelihood determining unit determines, based on input image data representing an input image, a likelihood degree of the input image being a halftone image. The filter unit includes spatial filters having different characteristics. The spatial filters produce a plurality of component-image data sets from the input image data. The output unit selectively outputs one of the component-image data sets.

According to other aspect of the present invention, there is provided an image-processing device including likelihood determining means for detecting, based on input image data representing an input image, a likelihood degree of the input image being a halftone image and component-image data generating means for generating component-image data by performing a filtering process on a image component of the input image according to one of a plurality of filtering characteristics corresponding to the likelihood degree determined by the likelihood determining means.

There is also provided an image processing method for processing image data. The image processing method includes determining a likelihood degree of an input image being a halftone image based on input image data representing the input image, generating a plurality of component-image data sets from the input image data, and outputting one of the component-image data sets based on the determined likelihood degree.

There is also provided an image-processing method for processing image data. The image-processing method includes determining a likelihood degree of an input image being a halftone image based on input image data representing the input image and generating component-image data by performing a filtering process on an image component of the input image according to one of a plurality of filtering characteristics corresponding to the likelihood degree determined by the determining step.

There is also provided a storing medium that stores a program of processing image data. The program includes the programs of determining a likelihood degree of an input image being a halftone image based on input image data representing the input image, generating a plurality of component-image data sets from the input image data, and outputting one of the component-image data sets based on the determined likelihood degree.

There is also provided a storing medium that stores a program of processing image data. The program includes the programs of determining a likelihood degree of an input image being a halftone image based on input image data representing the input image, and generating component-image data by performing a filtering process on an image component of the input image according to one of a plurality of filtering characteristics corresponding to the likelihood degree determined by the determining program.

BRIEF DESCRIPTION OF THE DRAWINGS

In the drawings:

FIG. 4(a) is an explanatory diagram showing the structure of a data table according to the first embodiment of the present invention;

FIG. 4(b) is an explanatory diagram showing the structure of a data table according to the second embodiment of the present invention;

FIG. 7 is an explanatory diagram showing the structure of a data table according to a modification of the preferred embodiments;

FIG. 10 is a flowchart representing a process (image process 3) equivalent to the ASIC of the second embodiment.

PREFERRED EMBODIMENTS OF THE PRESENT INVENTION

Next, preferred embodiments of the present invention will be described with reference to the accompanying drawings.

It should be noted that in the following description, "color components" are designated by a color model, for example. When the color model is the RGB model, the color components include red, green, and blue components. When using the YIQ color model, the color components are luminosity, in-phase, and quadrature. When using the CMY color model, the color components are cyan, magenta, and yellow. When using the HSL color model, the color components are hew, saturation, and lightness.

First Embodiment

Figure 1:
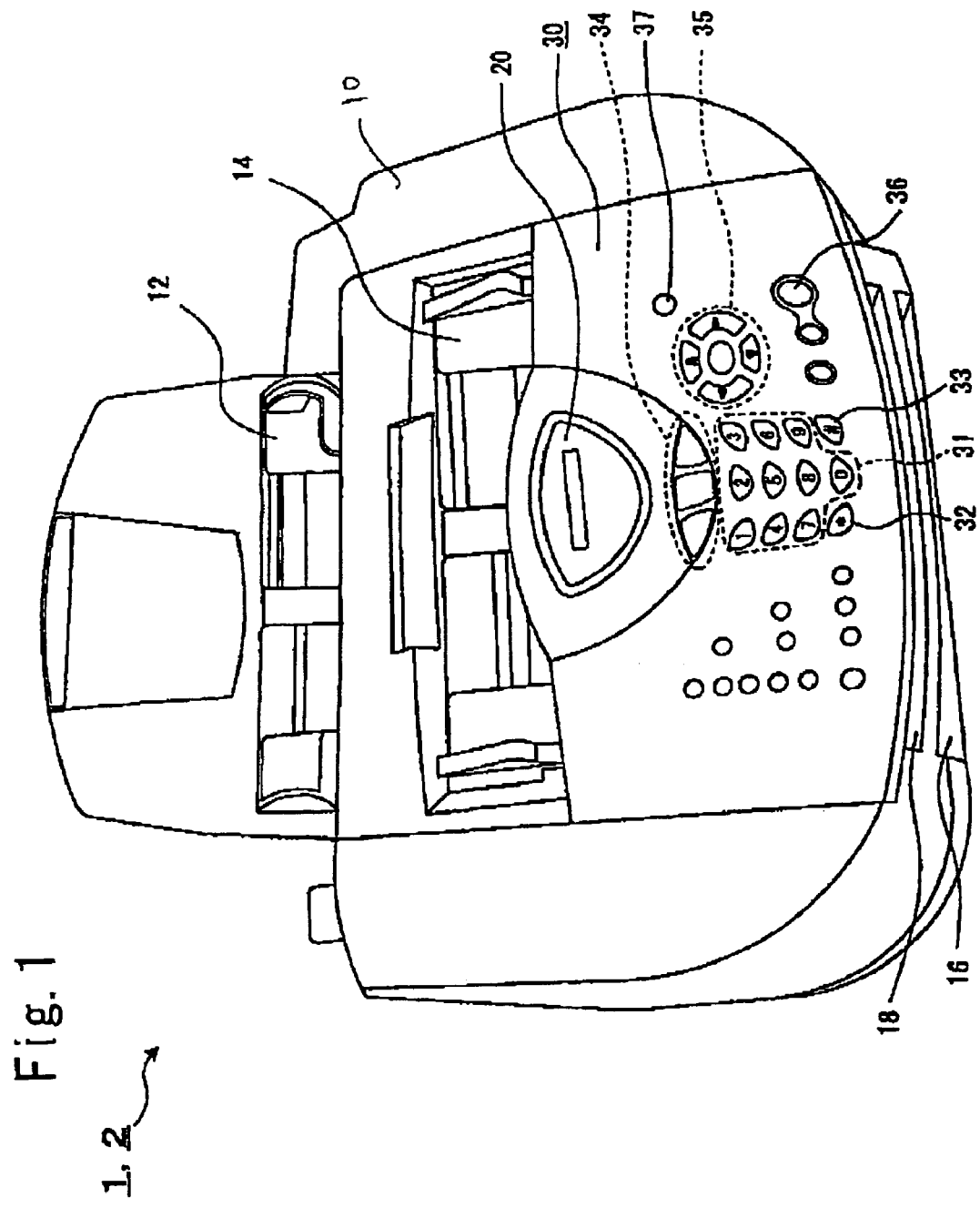
FIG. 1 is a perspective view of a multifunction device according to first and second embodiments of the present invention.

First, a multifunction device 1 according to a first embodiment of the present invention will be described. The multifunction device 1 according to the present embodiment includes printer, copier, scanner, and facsimile functions. As shown in FIG. 1, the multifunction device 1 includes a printer paper supply unit 12, a scanner paper supply unit 14, a printer paper discharge unit 16, a scanner paper discharge unit 18, a display panel 20, and a control panel 30.

The printer paper supply unit 12 is disposed on the rear side of a main casing 10, and the scanner paper supply unit 14 is disposed in the rear on the top of the main casing 10. The printer paper discharge unit 16 and the scanner paper discharge unit 18 are disposed on the front side of the main casing 10. The display panel 20 is disposed in the center on the top surface of the main casing 10. The control panel 30 is disposed on the top front side of the main casing 10.

The control panel 30 includes numeric buttons 31 for the numbers 0-9, an "*" button 32, a "#" button 33, function buttons 34, settings buttons 35, a start button 36, and a power button 37. The function buttons 34 are for switching the current function of the multifunction device 1 among a copier function, scanner function, and facsimile function. The setting buttons 35 are for setting various options for each function.

Figure 2:
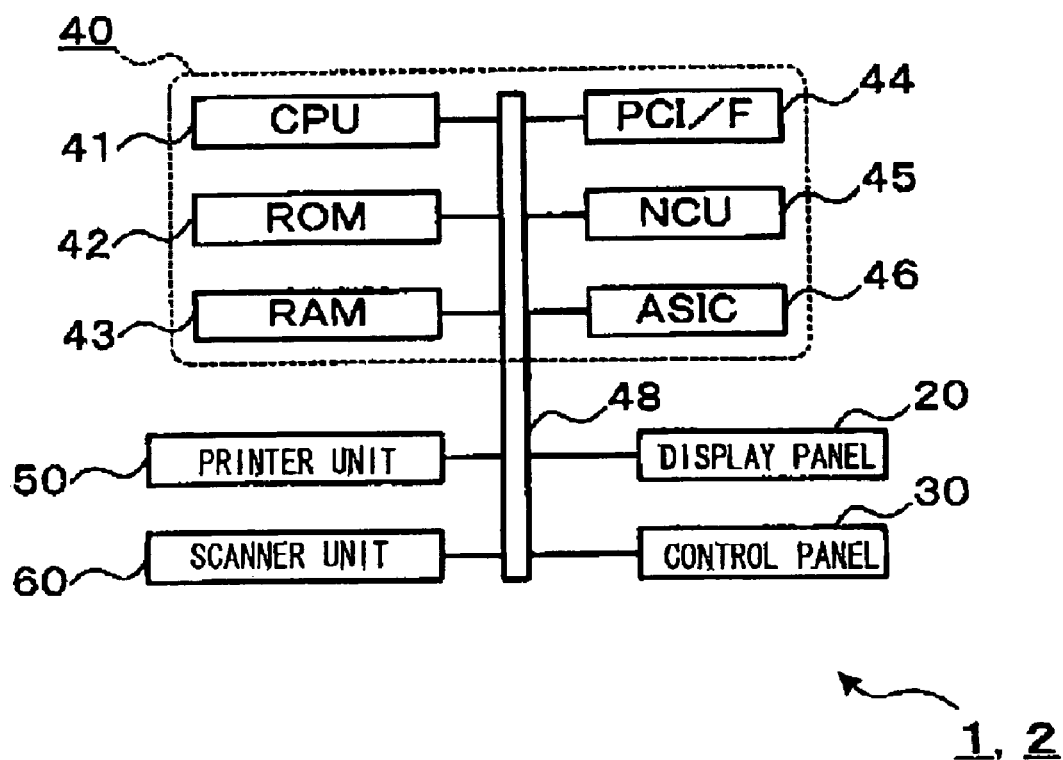
FIG. 2 is a block diagram showing the structure of the multifunction device of FIG. 1.

As shown in FIG. 2, the multifunction device 1 is provided with various built-in devices, including a control unit 40, a printer unit 50, and a scanner unit 60. The control unit 40 is for controlling the overall operations of the multifunction device 1.

The control unit 40 includes a central processing unit (CPU) 41, a read only memory (ROM) 42, a random access memory (RAM) 43, a PC interface 44, a network control unit (NCU) 45, and an application specific integrated circuit (ASIC) 46, all of which are connected to one another via a bus 46.

The CPU 41 controls the overall operations of the multifunction device 1 according to a procedure stored in the ROM 42. While performing this control, the CPU 41 stores results of calculations in the RAM 43 and transmits commands via the ASIC 46 to each component of the multifunction device 1. The PC interface 44 enables the multifunction device 1 to connect to and communicate with an external personal computer via a communication cable. The NCU 45 is an interface for connecting the multifunction device 1 to a telephone network. The ASIC 46 is an integrated circuit for processing image data representing an image scanned by the scanner unit 60.

The printer unit 50 functions to print images on paper set in the printer paper supply unit 12 as the paper is conveyed to the printer paper discharge unit 16. The printer unit 50 may employ any method for printing images, including the inkjet method, laser method, or thermal-transfer method.

The scanner unit 60 scans an image on an original document set in the scanner paper supply unit 14 as image data while the original document is conveyed to the scanner paper discharge unit 18. The scanner unit 60 reads the image from the original document as an image including R (red), G (green), and B (blue) component images designated by the RGB color model.

With the multifunction device 1 having this construction, a user presses the function button 34 to switch the active function of the multifunction device 1 as described above. If the user presses the start button 36 while the active function has been switched to the copier function, then the control unit 40 copies an original document set in the scanner paper supply unit 14.

In general terms, the control unit 40 issues a command to the scanner unit 60 to scan an image from the document set in the scanner paper supply unit 14. As a result, the scanner unit 60 scans an image from the document as image data (hereinafter referred to as "input image data"). After the input image data is processed by the ASIC 46, the control unit 40 issues a command to the printer unit 50 to print the image represented by this image data (output image data) on paper loaded in the printer paper supply unit 12. In this way, the printer unit 50 copies the document set in the scanner paper supply unit 14.

Next, the image process that the ASIC 46 performs on input image data will be described in greater detail, as well as the structure of circuits forming the ASIC 46. It should be noted that the following image process is performed on each of unit regions of an image. Each unit region has A×B pixels, where A and B are arbitrary numbers.

Figure 3:
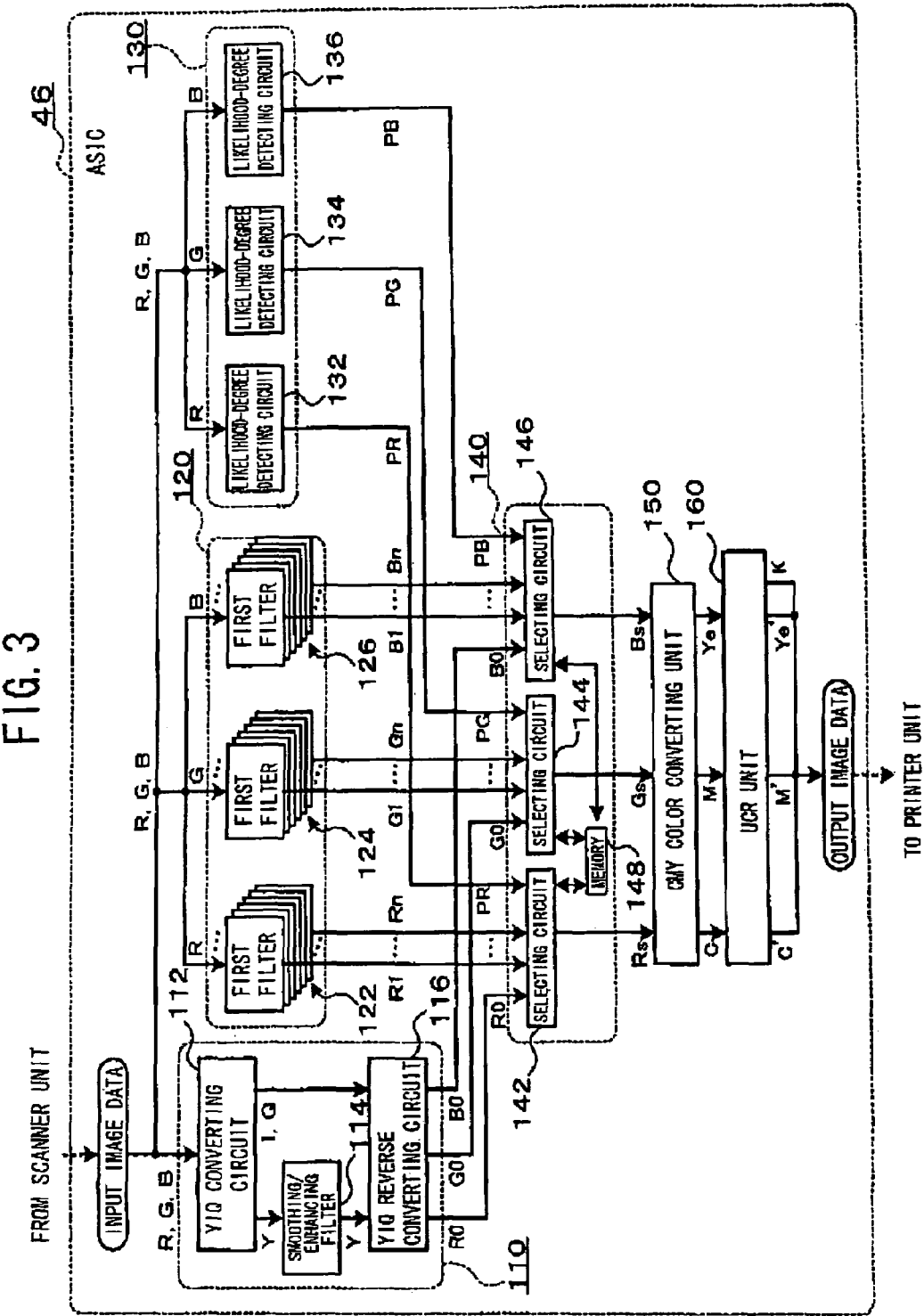
FIG. 3 is a block diagram showing the circuit structure if an ASIC according to the first embodiment of the present invention.

As shown in FIG. 3, the ASIC 46 includes a luminosity filtering unit 110, an RGB filtering unit 120, a likelihood-degree detecting unit 130, a component selecting unit 140, a CMY color converting unit 150, and a UCR unit 160.

The luminosity filtering unit 110 is for generating an image by performing a filtering process on the luminosity of an image represented by the input image data (hereinafter referred to as "input image"). The RGB filtering unit 120 is for generating a plurality of component images for each color component of an input image (R, G, and B component images) by performing a filtering process on each color component. The likelihood-degree detecting unit 130 is for detecting a degree of likelihood of each color component in an input image being a halftone image. The component selecting unit 140 is for selectively outputting a specific component image for each color component from the plurality of component images generated by the luminosity filtering unit 110 and the RGB filtering unit 120. The CMY color converting unit 150 is for converting an image including each color component image outputted by the component selecting unit 140 to an image including the C (cyan), M (magenta), and Ye (yellow) component images designated by the CMY color model. The UCR unit 160 is for performing under color removal on the image formed of the C, M, Ye components produced by the CMY color converting unit 150.

In the ASIC 46 having this construction, input image data scanned by the scanner unit 60 is inputted into the luminosity filtering unit 110, the RGB filtering unit 120, and the likelihood-degree detecting unit 130.

The luminosity filtering unit 110 includes a YIQ converting circuit 112, a smoothing/enhancing filter 114, and a YIQ reverse converting circuit 116. The YIQ converting circuit 112 is for converting an input image to an image including the Y (luminosity), I (in-phase), and Q (quadrature) component images designated by the YIQ color model. After the input image has been converted to Y, I, and Q components, the smoothing/enhancing filter 114 performs a filtering process on only the Y component image. Subsequently, the YIQ reverse converting circuit 116 converts the image back to an image including the R, G, and B component images (R0, G0, and B0 component images).

The smoothing/enhancing filter 114 is a spatial filter (band pass filter) set to characteristics for passing only the component in a frequency (spatial frequency) band thought to represent the Y (luminosity) component image of the input image. By performing this process, the noise component included in the luminosity will have been removed from the input image after the image has been reconverted by the YIQ reverse converting circuit 116. Here, "noise component" refers to a component caused by moiré or the like generated when scanning input image data for a halftone image, for example.

The RGB filtering unit 120 includes spatial filter groups 122, 124, and 126 provided for the respective RGB color components of the input image for generating a plurality of component images (R1-Rn component images, G1-Gn component images, and B1-Bn component images) for each color component of the input image. Each of the spatial filter groups 122, 124, and 126 includes a plurality of low pass filters ($1^{st}$ through $n^{th}$ filters) set to characteristics for decreasing the cutoff frequency in steps. Accordingly, the RGB filtering unit 120 can generate a plurality of component images in which the high frequency component of the image decreases in steps. In other words, the RGB filtering unit 120 can generate a group of component images in which the smoothness increases in steps (component images having a smoothness of 1, 2, . . . , and n, wherein n is the maximum degree of smoothness). The low pass filters in each spatial filter group 122, 124, 126 can remove noise components thought to be generated in accordance with differing degrees of likelihood that the input image is a halftone image. The low pass filters are set to characteristics for achieving a smoothness at least greater than the smoothing/enhancing filter 114 of the luminosity filtering unit 110. (For convenience, the smoothness of the smoothing/enhancing filter 114 is indicated by "0".)

The likelihood-degree detecting unit 130 includes a plurality of likelihood-degree detecting circuits 132, 134, and 136 provided for respective RGB color components of the input image for detecting likelihood degrees PR, PG, and PB. The likelihood degrees PR, PG, PB indicate degrees of likelihood that each color component in the input image is halftone image. The likelihood degrees PR, PG, PB are detected for each color component as one of a plurality of degrees 0, 1, . . . , and n based on a target pixel and pixels surrounding the target pixel. More specifically, a number of regions based on black dots or white dots is detected for the input image (single unit region) having A×B pixels in a method disclosed in Japanese Patent No. 2647456. Then, the number of regions is set as the degree of likelihood of being a halftone image. In the procedure to detect the likelihood degree, a priority may be assigned to each color component based on the conspicuousness of the color component, characteristics of the scanner unit 60, and the like (in other words, weighting is performed), and the number of regions (likelihood degree) may be corrected (by adding, subtracting, or multiplying a coefficient, for example) based on the priority when calculating the likelihood degrees.

Each color component (R0-Rn, G0-Gn, and B0-Bn) generated by the luminosity filtering unit 110 and the RGB filtering unit 120 and the degree of likelihood (PR, PG, and PB) of being halftone image for each color component detected by the likelihood-degree detecting unit 130 are inputted into the component selecting unit 140. The component selecting unit 140 is provided with selecting circuits 142, 144, and 146 corresponding to each color component. The aforementioned color components and likelihood degrees are inputted into the respective selecting circuits 142, 144, and 146.

Each of the selecting circuits 142, 144, and 146 in the component selecting unit 140 selects a color component to be outputted to the CMY color converting unit 150 from among the plurality of color components inputted from the luminosity filtering unit 110 and the RGB filtering unit 120 based on a data table T1 shown in FIG. 4(a) and the likelihood degree input from the likelihood-degree detecting unit 130. The data table T1 is stored in a memory 148 of the component selecting unit 140.

As shown in FIG. 4(a), the data table T1 provides correlations between likelihood degrees of being halftone image and the spatial filters so as to indicate which of the low pass filters in the spatial filter groups 122, 124, and 126 and the smoothing/enhancing filter 114 of the luminosity filtering unit 110 is the optimal spatial filter for removing the noise component thought to be generated with the degree of likelihood of the component image being a halftone image. Each of the selecting circuits 142, 144, and 146 selects a spatial filter corresponding to the likelihood degree PR, PG, PB inputted from the likelihood-degree detecting unit 130 and outputs the corresponding color component produced by the selected spatial filter to the CMY color converting unit 150.

In the present embodiment, the same data table T1 is referenced for each color component. However, a data table storing different correlations for each color component may be referenced, provided that an optimal filter can be selected for removing the noise component.

After the component selecting unit 140 selectively outputs the color components (Rs, Gs, and Bs), the CMY color converting unit 150 converts the image composed of these color components to an image composed of the C, M, and Ye components designated by the CMY color model.

After the CMY color converting unit 150 has converted the image to C, M, and Ye components, the UCR unit 160 generates a K (black) component based on regions in which each color component is mixed to represent the black color and generates new C', M', and Ye' components by subtracting a value corresponding to the K component from each C, M, and Ye component. As a result, C', M', Ye', and K components are generated by the UCR unit 160.

Image data representing an image formed of the C', M', Ye', and K components created through under color removal by the UCR unit 160 (output image data) is transmitted to the printer unit 50. Subsequently, the printer unit 50 prints the image indicated by the output image data.

In the multifunction device 1 described above, the ASIC 46 of the control unit 40 can select for each color component a component image corresponding to the degree of likelihood of the input image being a halftone image, from a plurality of component images generated for each color component using spatial filters having different characteristics (degree of smoothness). The ASIC 46 can then selectively output image data (output image data) representing an image formed of the selected component images (Rs, Gs, and Bs) to the printer unit 50.

Because the determination of which one of component images generated by the spatial filters to select is made based on the degree of likelihood of the input image being a halftone image, it is possible to select a component image from the plurality of component images that is most suitable for the degree of likelihood of being a halftone image, thereby reducing the occurrence of images having an undesirable noise component. Further, the greater the number of spatial filters, the more choices of component image data, facilitating the selection and output of component image data suited to the degree of likelihood of being halftone-image area and reducing the likelihood of using a spatial filter with characteristics that are not optimal.

In the present embodiment, there are provided spatial filters having characteristics for removing the noise component anticipated in an input image according to the degree of likelihood of being a halftone image. Therefore, by selecting a component image from the plurality of component images generated by the group of spatial filters based on the degree of likelihood of the input image being a halftone image, it is possible to obtain and output an image formed of component images from which the noise component has been reliably removed.

Further, the selecting circuits 142, 144, and 146 can select filters from the data table TI that correspond to the likelihood degrees PR, PG, and PB inputted from the likelihood-degree detecting unit 130 and can output the color components (Rs, Gs, and Bs components) generated by these filters to the CMY color converting unit 150.

Since it is possible to acquire an image formed of component images obtained by performing a filtering process on each color component of the input image, the image can be expected to have a reduced noise component. The reason for this is as follows. While it can also be assumed that the noise component is formed of a plurality of color components, since the input image is composed of a plurality of color components, it is unlikely that the noise component is distributed equally among all color components. The noise component is more likely to be reduced in the final image when the image is formed of component images (component image data) produced from spatial filters having different characteristics for each color component.

Second Embodiment

Next, a multifunction device 2 according to a second embodiment of the present invention will be described. The multifunction device 2 has the same construction as the multifunction device 1 of the first embodiment, differing only in the circuit construction of the ASIC 46. Therefore, only this difference will be described.

Figure 5:
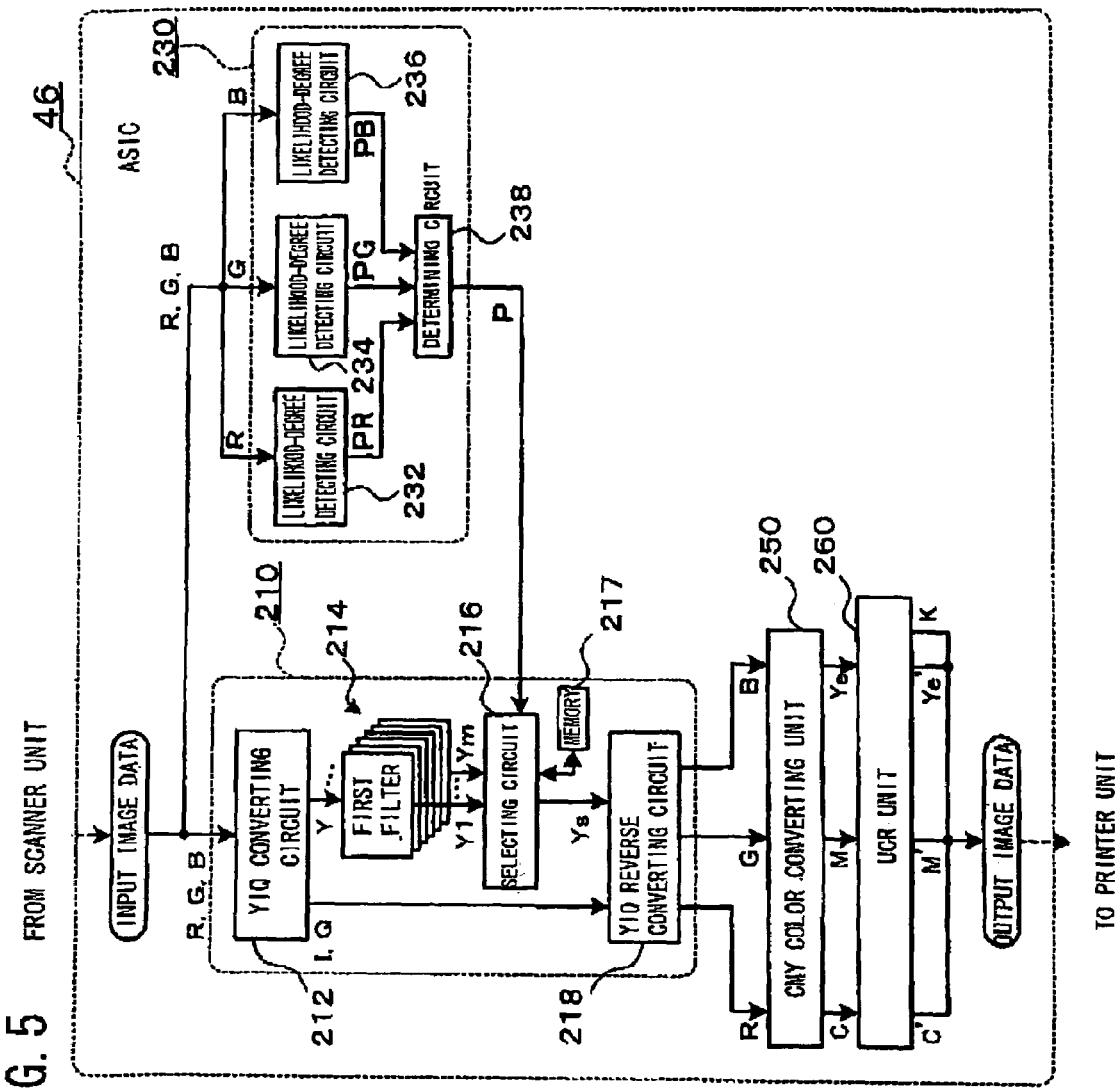
FIG. 5 is a block diagram showing the circuit structure of an ASIC according to the second embodiment of the present invention.

As shown in FIG. 5, the ASIC 46 includes a luminosity filtering unit 210, a likelihood-degree detecting unit 230, a CMY color converting unit 250, and a UCR unit 260.

The luminosity filtering unit 210 is for generating an image by performing a filtering process on the luminosity of an input image. The likelihood-degree detecting unit 230 is for detecting a degree of likelihood of the input image being a halftone image, for each color component in the input image. The CMY color converting unit 250 is for converting the image generated by the luminosity filtering unit 210 to an image including the C, M, and Ye component images designated by the CMY color model. The UCR unit 260 is for performing under color removal on the image produced by the CMY color converting unit 250.

In the ASIC 46 having this construction, input image data scanned by the scanner unit 60 is inputted into the luminosity filtering unit 210 and the likelihood-degree detecting unit 230.

The likelihood-degree detecting unit 230 includes a plurality of likelihood-degree detecting circuits 232, 234, and 236 provided for each respective RGB color component of the input image for detecting likelihood degrees PR, PG, and PB for each color component in the input image.

A determining circuit 238 sets the maximum value among the likelihood degrees PR, PG, and PB detected by the likelihood-degree detecting circuits 232, 234, and 236 as a likelihood degree P for the overall input image. In this embodiment, the determining circuit 238 determines the likelihood degree P as one of a plurality of levels (when P=0, 1, ..., n; where n is the maximum likelihood degree of being halftone image).

The luminosity filtering unit 210 includes a YIQ converting circuit 212 for converting an input image to an image including the Y, I, and Q component images designated by the YIQ color model. After the input image is converted to Y, I, and Q components in this way, a spatial filter group 214 is applied only to the Y (luminosity) component image to generate a plurality of component images (Y1-Ym component images, where m=n+1).

More specifically, the spatial filter group 214 uses a plurality of spatial filters ($1^{st}$-$m^{th}$ filters) to generate a group of component images Y1-Ym having a smoothness that increases in steps (component images with a smoothness of 0, 1, ..., n; where n is the maximum smoothness). The spatial filter in the spatial filter group 214 having a smoothness "0" ($1^{st}$ filter) is a band pass filter set to the same characteristics as the smoothing/enhancing filter 114 in the first embodiment.

The selecting circuit 216 selects a color component to be outputted to the CMY color converting circuit 218 from among the plurality of color components inputted from the filter group 214 based on a data table T2 shown in FIG. 4(*b*) which is stored in a memory 217 and the likelihood degree P. As shown in FIG. 4(*b*), the data table T2 provides correlations between likelihood degrees and spatial filters to indicate which of the spatial filter in the spatial filter group 214 is the optimal spatial filter for removing the noise component thought to be generated with the degree of likelihood that the input image is halftone image. The selecting circuit 216 selects a spatial filter corresponding to the likelihood degree P inputted from the likelihood-degree detecting unit 230 and outputs the component image (Ye component) generated by the selected spatial filter to the YIQ reverse converting circuit 218.

Next, a YIQ reverse converting circuit 218 converts an image formed of the selected Y component image and the I and Q component images back to an image formed of R, G, and B component images.

After the YIQ reverse converting circuit 218 converts the image back to the image formed of RGB component images, the CMY color converting unit 250 converts the image to an image formed of the C, M, Ye components designated y the CMY color model.

After the CMY color converting unit 250 has converted the image to C, M, and Ye components, the UCR unit 260 generates a K (black) component based on regions in which each color component is mixed to represent the black color and generates new C', M', and Ye' components by subtracting a value corresponding to the K component from each C, M, Ye component. As a result, C', M', Ye', and K components are generated by the UCR unit 260.

Image data representing an image formed of the C', M', Ye', and K components created through under color removal by the UCR unit 260 (output image data) is transmitted to the printer unit 50. Subsequently, the printer unit 50 prints an image indicated by the output image data.

In addition to the effects obtained from its identical construction with the multifunction device 1 of the first embodiment, the multifunction device 2 having the construction described above obtains the following effects.

The ASIC 46 of the multifunction device 2 is configured to remove the noise component by performing a filtering process only on the luminosity component in the input image, thereby preventing a change in saturation along with noise removal.

Since humans are more sensitive to color luminosity than saturation, the noise component in luminosity is more liable to be perceived as noise. Hence, by removing only the noise component in luminosity, it is possible to sufficiently remove from an image the noise component that can be detected by human eyesight. From this point of view, it is preferable to perform the filtering process only on the luminosity component in the input image.

Further, the selection circuit 216 can select a spatial filter based on the maximum likelihood degree P among the likelihood degrees for each color component in the input image.

<Modifications>

While the invention has been described in detail with reference to specific embodiments thereof, it would be apparent to those skilled in the art that many modifications and variations may be made therein without departing from the spirit of the invention, the scope of which is defined by the attached claims.

For example, in the above-described embodiments, the ASIC 46 is described as being provided in a multifunction device. However, the ASIC 46 may also be incorporated in a device other than a multifunction device.

In the embodiments described above, circuits formed in the ASIC 46 have been described as example of image-processing device. However, these circuits may also be formed in a programmable logic device or other device.

In the first embodiment described above, the selecting circuits 142, 144, and 146 of the component selecting unit 140 are configured to select spatial filters based on the likelihood degrees detected by the likelihood-degree detecting unit 130. However, as with the likelihood-degree detecting unit 230 of the second embodiment, the likelihood-degree detecting unit 130 may be configured to detect the degree of likelihood of being halftone image for the overall input image rather than for each color component and to select a spatial filter based on the degree of likelihood of being halftone image for the overall input image.

Figure 6:
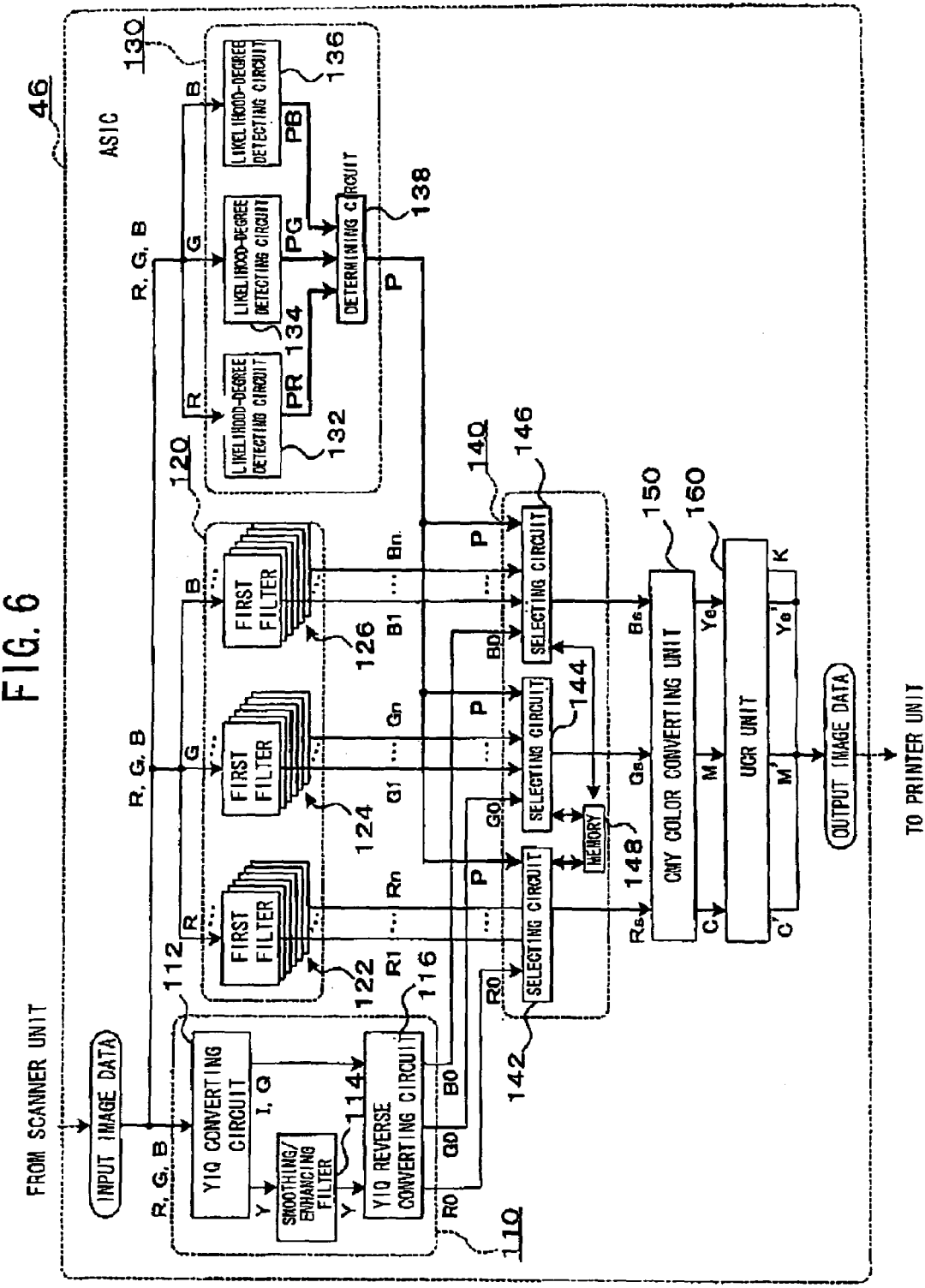
FIG. 6 is a block diagram showing the circuit structure of an ASIC according to a modification of the first embodiment.

Specifically, as shown in FIG. 6, the likelihood-degree detecting unit 130 may be provided with a determining circuit 138 for determining the likelihood degree P of being halftone image for the overall input image based on the likelihood degrees PR, PG, PB detected by the likelihood-degree detecting circuits 132, 134, and 136, and the likelihood-degree detecting unit 130 may be configured to output the likelihood degree P to the component selecting unit 140.

In the first embodiment described above, the component selecting unit 140 is configured to select a spatial filter corresponding to a likelihood degree inputted from the likelihood-degree detecting unit 130 and to output a color component generated by the selected spatial filter to the CMY color converting unit 150, for each color component. However, the component selecting unit 140 may select two or more spatial filters for each color component and combine color components generated with these spatial filters. Specifically, a correlation between a specific likelihood degree (such as a likelihood degree 1) and a plurality of spatial filters (such as the smoothing/enhancing filter 114 and the $1^{st}$ filter) may be entered in a data table as shown in FIG. 7. The component selecting unit 140 may then combine two or more component images from the plurality of component images generated with the spatial filter groups 122, 124, and 126 and output the composite image as a component image.

For example, when combining a half component each of component images generated using two spatial filters, the generated composite image data forms a component similar to a component image created using a spatial filter having characteristics in between the two spatial filters. Hence, by outputting a composite image as a component image, the component selecting unit 140 can complementarily generate component image data for a component that cannot be created with any one of available spatial filters.

Therefore, if the degree of likelihood of the input image being halftone image is a specific value indicating that the noise component can be sufficiently removed from the input image by a spatial filter having characteristics between two of the available spatial filters, then it is not necessary to add a new spatial filter to the RGB filtering unit 120. In this case, the data table need only be rewritten to select a composite image formed by combining component images generated using the aforementioned two spatial filters.

Further, the likelihood-degree detecting unit 130 may correct the likelihood degrees PR, PG, PB and output the corrected likelihood degrees to the component selecting unit 140.

In the second embodiment, the selection circuit 216 of the luminosity filtering unit 210 is configured to select a spatial filter based on the maximum likelihood degree (P) among the likelihood degrees PR, PG, PB. However, the selection circuit 216 may be configured to select a spatial filter based on data other than the maximum likelihood degree, such as an average of the likelihood degrees PR, PG, and PB. Specifically, the determining circuit 238 of the likelihood-degree detecting unit 230 may be configured to determine an average of the likelihood degrees PR, PG, and PB as a likelihood degree P for the overall input image.

Further, priorities may be assigned to the color components based on the prominence of the color component, characteristics of the scanner unit 60, or the like in what is referred to as a weighting process, as part of the configuration for selecting a spatial filter based on likelihood degrees. With this configuration, the determining circuit 138, 238 corrects the degree of likelihood of being halftone image for each color component based on the priority through adding, subtracting, or multiplying a coefficient, for example, and select component image data based on the maximum value or average value of the corrected likelihood degrees. For example, the likelihood degrees may be corrected by setting a high priority for the G (green) component, which is highly visible, and gradually lowering the priorities for the B (blue) and R (red) components. However, this is only one example of a priority order and may be modified according to the conditions. In this example, each selecting circuit 142, 144, 146, 216 can select a spatial filter based on the likelihood degrees of the color components being halftone image that have been amended to reflect the priorities.

In the embodiments described above, spatial filters are selected based on the data table T1, T2 stored in the memory 148, 217. However, a construction other than this data table may be used for selecting spatial filters.

In the above embodiments, the number of regions within an input image having A×B pixels around a target pixel is calculated in a manner described in Japanese Patent No. 2647456, and the number of regions is determined as a likelihood degree of being a halftone image. However, other methods may be employed for determining a likelihood degree. For example, density of maximum luminosity and minimum luminosity, which change in a regular cycle, is detected in a manner disclosed in Japanese unexamined patent application publication No. HEI-8-181864, and then the density could be determined as likelihood degree of being a halftone image.

Alternatively, in a manner described in Japanese unexamined patent application publication No. HEI-8-237475, an absolute value of the difference between total values for a pair of pixels positioned symmetrically about a target pixel is determined when a component (density) of the target pixel is the maximum or minimum value among pixels making up a unit image. Then, a value (1, . . . , n) corresponding to the absolute value could be determined as a likelihood degree of being halftone image. In this case, a likelihood degree is set to "0" when the component of the target pixel is not the maximum or minimum value. Also, while the method in Japanese unexamined patent application publication No. HEI-8-237475 determines that a halftone dot exists when a plurality of evaluation values are greater than a prescribed threshold value, one of the values 1, . . . , and n corresponding to the average of the plurality of evaluation values is determined as a likelihood degree of being halftone image.

In the above embodiments, a component image is selected from among a plurality of component images based on a detected likelihood degree of being a halftone image. However, the image-processing device may also be configured to generate component image using only a spatial filter selected based on the detected likelihood degree of being a halftone image.

It is possible to generate data of a plurality of component images for each of a plurality of color components designated by a plurality of color models through the above-described filtering process. For example, component image data for one, two, or more color components in a specific color model and component image data for one, two, or more color components in a separate color model could be generated.

The image process performed by the ASIC 46 in the embodiments described above may be implemented by the CPU 41 in software. Steps in such a process executed by the CPU 41 will be described next with reference to FIGS. 8-10. This process is executed when the scanner unit 60 reads input image data. In this example, an input image, which is represented by the input image data read by the scanner unit 60, has a plurality of unit regions ($1^{st}$-$x^{th}$ regions)

<Image Process 1>

Figure 8:
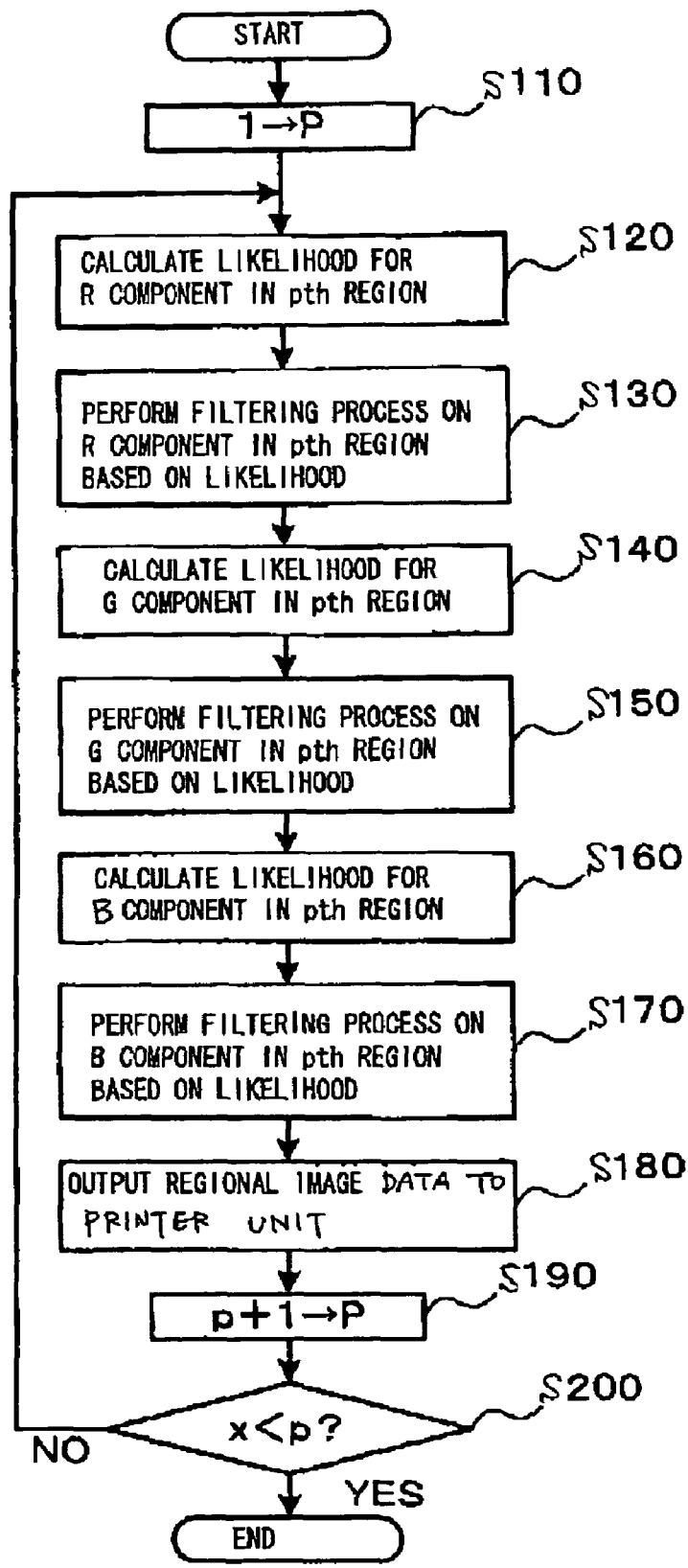
FIG. 8 is a flowchart representing a process (image process 1) equivalent to the ASIC of the first embodiment.

First, an image process equivalent to the ASIC 46 of the first embodiment will be described with reference to FIG. 8.

At the beginning of the process in S110, the CPU 41 sets a variable P to 1 (P←1). In the following description, the value "p" indicates the value to which the variable P is set.

In S120, the CPU 41 determines the likelihood degree PR for the R component in the $p^{th}$ region of the input image. The method for detecting the likelihood degree of being halftone image in this process is identical to the method performed by the likelihood-degree detecting unit 130, 230 described above.

In S130, the CPU 41 performs a filtering process on the R component of the $p^{th}$ region in accordance with the likelihood degree PR detected in S120. In this process, the CPU 41 generates a component image that has undergone a filtering process using filtering characteristics entered in a data table that correspond to the likelihood degree PR detected in S120. The data table in this example is identical to that stored in the memory 148 or the like described above. However, this data table is stored in the RAM 43 and includes entries of filter characteristics (smoothness) in place of the spatial filters.

In S140, the CPU 41 determines a likelihood degree PG for the G component in the $p^{th}$ region of the input image, similar to the process of S120. In S150, the CPU 41 performs a filtering process on the G component in the $p^{th}$ region, similar to the process of S130 in accordance with the likelihood degree PG detected in S140.

In S160, the CPU 41 determines a likelihood degree PB for the B component in the $p^{th}$ region of the input image, similar to the process of S120. In S170, the CPU 41 performs a filtering process on the B component in the $p^{th}$ region, similar to the process of S130 in accordance with the likelihood degree PB detected in S160.

In S180, the CPU 41 outputs regional image data to the printer unit 50. This regional image data represents a regional image formed of the component images that were produced from the filtering processes in S130, S150, and S170.

In S190, the CPU 41 increments the variable P by one (P←p+1). In S200, the CPU 41 determines whether the value p of the variable P is greater than the number x, which is the number of regions in the input image, (x<p).

If the CPU 41 determines in S200 that the value p is not greater than the number x (S200:NO), then the CPU 41 returns to S120 and performs the processes described above for the next region of the input image. However, if the CPU 41 determines in S200 that the value p is greater than the number x (S200:YES), then the image process ends.

<Image Process 2>

Figure 9:
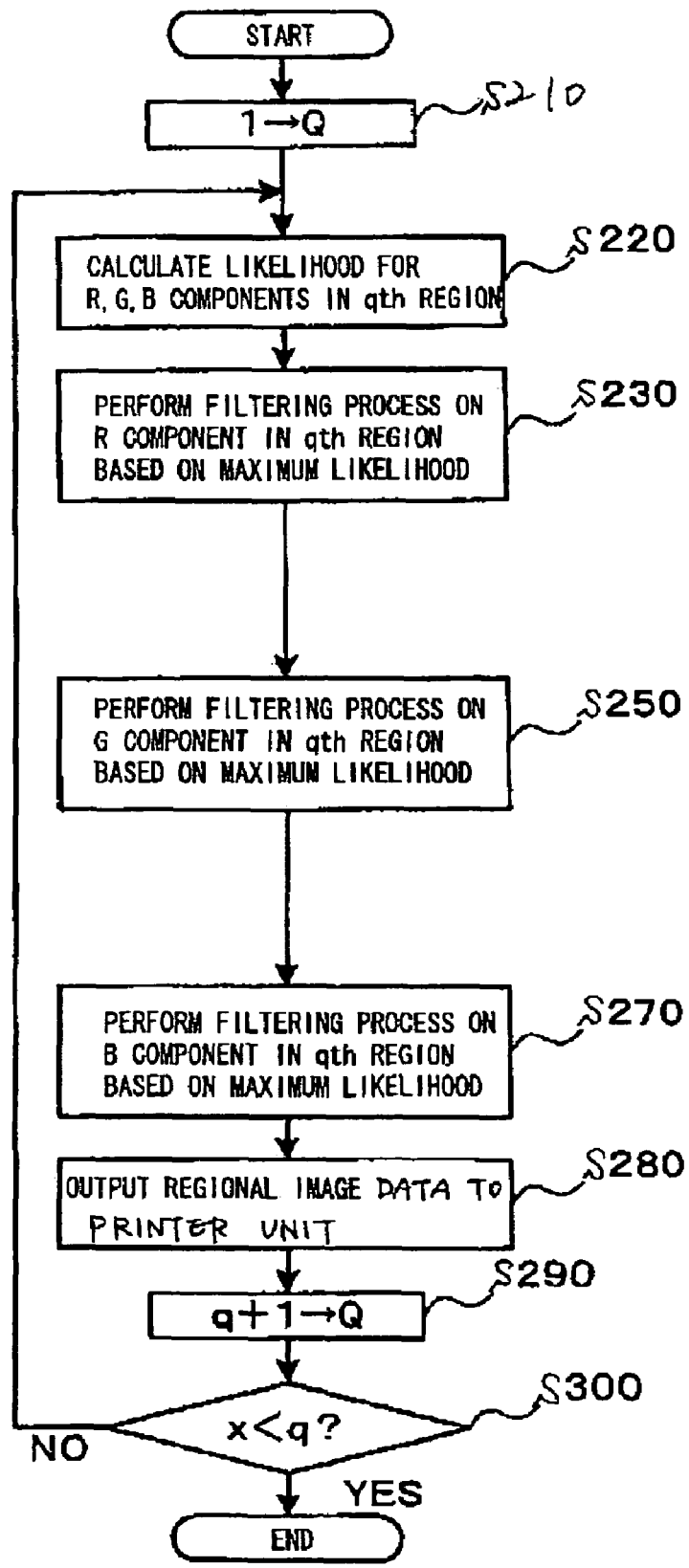
FIG. 9 is a flowchart representing a process (image process 2) equivalent to the ASIC of the modification of the first embodiment.

Next, a process equivalent to the ASIC 46 of the modification of the first embodiment shown in FIG. 6 will be described with reference to FIG. 9.

At the beginning of the process in S210 the CPU 41 sets a variable Q to 1 (Q←1). In the following description, the value "q" indicates the value to which the variable Q is set.

In S220, the CPU 41 determines likelihood degrees PR, PG, and PB for each component R, G, and B in the $q^{th}$ region of the input image. This process is similar to the process of S120 described above.

In S230, the CPU 41 performs a filtering process on the R component in the $q^{th}$ region in accordance with the maximum likelihood degree Pmax among the likelihood degrees PR, PG, and PB detected in S220. This process is identical to the process in S130 described above, except that the filtering process performed corresponds to the maximum likelihood degree Pmax.

In S250, the CPU 41 performs a filtering process on the G component in the $q^{th}$ region in accordance with the maximum likelihood degree Pmax, similar to the process of S230.

In S270, the CPU 41 performs a filtering process on the B component in the $q^{th}$ region in accordance with the maximum likelihood degree Pmax, similar to the process of S230.

In S280, the CPU 41 outputs regional image data to the printer unit 50. This regional image data represents a regional image formed of the component images that were produced from the filtering processes in S230, S250, and S270.

In S290, the CPU 41 increments the variable Q by one (Q←q+1). In S300, the CPU 41 determines whether the value q of the variable Q is greater than the number x (x<q).

If the CPU 41 determines that the value q is not greater than the number x (S300:NO), then the CPU 41 returns to S220 and performs the processes described above for the next region of the input image. However, when the value q is greater than the number x (S300:YES), then the image process ends.

<Image Process 3>

Next, a process equivalent to the ASIC 46 of the second embodiment will be described with reference to FIG. 10.

At the beginning of the process in S310, the CPU 41 sets a variable T to 1 (T←1). In the following description, the value "t" indicates the value to which the variable T is set.

In S320, the CPU 41 determines likelihood degrees PR, PG, and PB for each component R, G, and B in the $t^{th}$ region of the input image. This process is similar to the process of S120 described above.

In S330, the CPU 41 converts the $t^{th}$ region of the input image to a regional image formed of Y, I, and Q components. The method of conversion in this process is identical to the method performed by the YIQ converting circuit 212 described above.

In S340, the CPU 41 performs a filtering process on the Y component in the regional image produced in S330 in accordance with the maximum likelihood degree Pmax among the likelihood degrees PR, PG, and PB detected in S320. In this process, the CPU 41 generates a component image by performing a filtering process using filter characteristics entered in a data table that corresponding to the maximum likelihood degree Pmax. The data table in this example is identical to that stored in the memory 217 or the like described above. However, this data table is stored in the RAM 43 and includes entries of filter characteristics (smoothness) in place of the spatial filters.

In S350, the CPU 41 converts the regional image produced in S330 back to a regional image formed of R, G, and B components. The method of conversion in this process is identical to the method used by the YIQ reverse converting circuit 218 described above.

In S360, the CPU 41 outputs regional image data to the printer unit 50. This regional image data represents the regional image converted in S350. In S370, the CPU 41 increments the variable T by one (T←t+1).

In S380, the CPU 41 determines whether the value t of the variable T is greater than the number x (x<t).

If the CPU 41 determines that the value t is not greater than the number x (S380:NO), then the CPU 41 returns to S320 and performs the processes described above for the next region of the input image. However, when the value t is greater than the number x (S380:YES), then the image process ends.

It should be noted that the computer program executed by the CPU 41 to implement the steps described above may be provided to the image-processing device itself, a computer system, or a user of these devices via a storage medium, such as a floppy disc or a CD-ROM. The computer executing this computer program may be a computer system with a built-in image-processing device, or a computer system connected to and capable of performing data communications with the image-processing device through a wired or wireless communications line.

What is claimed is:

1. An image-processing device comprising:
   a likelihood determining unit that determines, based on input image data representing an input image, a likelihood degree that color components of the input image are a halftone image and the likelihood degree determined for the color components is one of a plurality of degrees (n, n−1 . . . 0);
   a filter unit that includes spatial filter groups provided for the color components of the input image and each of the spatial filter groups includes a plurality of filters set to having different characteristics, the spatial filter groups producing a plurality of component-image data sets from the input image data;
   an output unit that selects a corresponding color component-image data from each of the spatial filter groups based on the likelihood degree (n, n−1 . . . 0) for the color components to create one component-image data set and outputs the created one component-image data set, wherein:
   the spatial filter groups generate the plurality of component-image data sets for each one of a plurality of color components in the input image, and the output unit outputs one of the component-image data sets for each of the plurality of color components in the input image, and
   the likelihood determining unit determines likelihood degrees each for one of the plurality of color components in the input image, and the output unit outputs one of the component-image data sets for each one of the plurality of color components, based on a maximum one of the likelihood degrees determined by the likelihood determining unit; and
   a correcting unit that corrects a likelihood degree determined by the likelihood determining unit according to a priority set for each of the plurality of color components, and the output unit outputs one of the plurality of component-image data sets for each of the plurality of color components, based on a maximum one of the likelihood degrees determined by the likelihood determining unit and corrected by the correcting unit.

2. The image-processing device according to claim 1, wherein the output unit outputs composite image data representing an image formed by combining component images represented by at least two of the plurality of component-image data sets based on the likelihood degree determined by the likelihood determining unit.

3. The image-processing device according to claim 1, further comprising a memory that stores a data table indicating a correspondence between the plurality of filters and the plurality of degrees (n, n−1 . . . 0), wherein the output unit selectively outputs one of the component-image data sets with referencing the data table.

4. The image-processing device according to claim 1, wherein the spatial filter groups generate the plurality of component-image data sets by performing a filtering process on luminosity component among color components in the input image.

5. The image-processing device according to claim 1, wherein the spatial filter groups generate the plurality of component-image data sets by performing a filtering process on R, G, B components in the input image, the filter unit further includes a converting unit having a filter and a generator, the filter performing a filtering process on a luminosity component of the input image, the generator generating a component-image data set from the luminosity component which has been undergone the filtering process by the filter.

6. An image-processing device comprising:
   a likelihood determining unit that detects, based on input image data representing an input image, a likelihood degree that color components of the input image are a halftone image and the likelihood degree determined for the color components is one of a plurality of degrees (n, n−1 . . . 0);
   a component-image data generating unit that generates component-image data by performing a filtering process with a spatial filter group on a image component of the input image according to one of a plurality of filtering characteristics corresponding to the likelihood degree determined by the likelihood determining unit;
   an output unit that selects one component-image data set from a plurality of component-image data sets based on the likelihood degree and selectively outputs the selected one component-image data set, wherein:
      the component-image data generating unit generates the plurality of component-image data sets each for one of a plurality of color components in the input image, and
      the likelihood determining unit determines likelihood degrees each for one of the plurality of color components in the input image, and the component-image data generating unit generates a plurality of component-image data sets each for one of the plurality of color components in accordance with a maximum one of the likelihood degrees; and
      a correcting unit corrects a likelihood degree determined by the likelihood determining unit according to a priority set for each of the plurality of color components, and the output unit outputs one of the plurality of component-image data sets for each of the plurality of color components, based on a maximum one of the likelihood degrees determined by the likelihood determining unit and corrected by the correcting unit.

7. The image-processing device according to claim 6, further comprising a memory that stores a data table indicating a correspondence between the plurality of filter characteristics and the plurality of degrees (n, n−1 . . . 0), wherein the component-image data generating unit performs the filtering process with reference to the data table in accordance with the likelihood degree.

8. The image-processing device according to claim 6, wherein the component-image data generating unit generates the component-image data by performing the filtering process on luminosity component among color components in the input image.

9. The image-processing device according to claim 6, wherein the component-image data generating unit generates the component-image data by performing the filtering process either on R, G, B components or a luminosity component in the input image in accordance with the likelihood degree.

10. An image processing method for processing image data, the image processing method comprising:

a) determining a likelihood degree, with an image processing device, that color components of an input image are a halftone image based on input image data representing the input image and the likelihood degree determined for the color components is one of a plurality of degrees (n, n−1 . . . 0);
b) generating from spatial filter groups provided for the color components of the input image a plurality of component-image data sets from the input image data and each of the spatial filter groups includes a plurality of filters set to having different characteristics;
c) selecting one component-image data set from the plurality of component-image data sets based on the determined likelihood degree (n, n−1 . . . 0) for the color components;
d) outputting the selected one component-image data, wherein:
   in the step b) the plurality of component-image data sets are generated for each one of a plurality of color components in the input image, in step c) the one component-image data set is selected for each of the plurality of color components in the input image and in step d) the one component-image data set selected for each of the plurality of color components in the input image is output, and
   in step a) the likelihood degree is determined each for one of the plurality of color components in the input image, and in step d) one of the component-image data sets is outputted for each one of the plurality of color components, based on a maximum one of the likelihood degrees determined; and
   correcting a determined likelihood degree determined according to a priority set for each of the plurality of color components, and in step d) one of the plurality of component-image data sets is outputted for each of the plurality of color components, based on a maximum one of the likelihood degrees determined and corrected.

11. An image-processing method for processing image data, the image-processing method comprising:
   determining a likelihood degree, with an image processing device, that color components of an input image are a halftone image based on input image data representing the input image and the likelihood degree determined for the color components is one of a plurality of degrees (n, n−1 . . . 0);
   generating from a spatial filter group, a plurality of component-image data sets by performing a filtering process on an image component of the input image according to one of a plurality of filtering characteristics corresponding to the likelihood degree determined by the determining step;
   selecting one component-image data set from a plurality of component-image data sets based on the likelihood degree;
   outputting the selected one component-image data set, wherein:
      the plurality of component-image data sets are generated for each of a plurality of color components in the input image, and
      likelihood degrees are determined each for one of the plurality of color components in the input image, and a plurality of component-image data sets are generated each for one of the plurality of color components in accordance with a maximum one of the likelihood degrees; and a determined likelihood degree is corrected according to a priority set for each of the plurality of color components, and the plurality of component-image data sets are outputted for each of the plurality of color components, based on a maximum one of the likelihood degrees determined and corrected.

12. A computer-readable storing medium that stores a program of processing image data, program comprising the programs of:
   determining a likelihood degree that color components of an input image are a halftone image based on input image data representing the input image and the likelihood degree determined for the color components is one of a plurality of degrees (n, n−1 . . . 0);
   generating from spatial filter groups provided for the color components of the input image a plurality of component-image data sets from the input image data and each of the spatial filter groups includes a plurality of filters set to having different characteristics;
   selecting one component-image data set from a corresponding color component-image data from each of the spatial filter groups based on the likelihood degree (n, n−1 . . . 0) for the color components; and
   outputting the selected one component-image data set, wherein
      the generating program generates the plurality of component-image data sets for each one of a plurality of color components in the input image, and the outputting program outputs one of the plurality of component-image data sets for each of the plurality of color components in the input image, and
      the likelihood degree is determined each for one of the plurality of color components in the input image, and one of the component-image data sets is outputted for each one of the plurality of color components, based on a maximum one of the likelihood degrees; and
      correcting a likelihood degree determined according to a priority set for each of the plurality of color components, and the outputting occurs for one of the plurality of component-image data sets for each of the plurality of color components, based on a maximum one of the likelihood degrees determined and corrected.

13. A computer-readable storing medium that stores a program of processing image data, the program comprising the programs of:
   determining a likelihood degree that color components of an input image are a halftone image based on input image data representing the input image and the likelihood degree determined for the color components is one of a plurality of degrees (n, n−1 . . . 0);
   generating from a spatial filter group, component-image data by performing a filtering process on an image component of the input image according to one of a plurality of filtering characteristics corresponding to the likelihood degree determined by the determining program;
   selecting one component-image data set from a plurality of component-image data sets based on the likelihood degree;
   outputting the selected one component-image data set, wherein:
      the generating program generates the plurality of component-image data sets each for one of a plurality of color components in the input image, and
      likelihood degree are determined each for one of the plurality of color components in the input image, and generating a plurality of component-image data sets each for one of the plurality of color components in accordance with a maximum one of the likelihood degrees; and
   correcting a likelihood degree determined according to a priority set for each of the plurality of color components, and the outputting occurs for one of the plurality of component-image data sets for each of the plurality of color components, based on a maximum one of the likelihood degrees determined and corrected.

* * * * *